No. 707,663. Patented Aug. 26, 1902.
M. F. WHITON.
RAIL BOND.
(Application filed Feb. 3, 1902.)
(No Model.)

Witnesses:
H. B. Davis.
M. E. Bill

Inventor;
Morris F. Whiton.
by B. J. Hayes
Atty

UNITED STATES PATENT OFFICE.

MORRIS F. WHITON, OF HINGHAM, MASSACHUSETTS.

RAIL-BOND.

SPECIFICATION forming part of Letters Patent No. 707,663, dated August 26, 1902.

Application filed February 3, 1902. Serial No. 92,342. (No model.)

*To all whom it may concern:*

Be it known that I, MORRIS F. WHITON, of Hingham, county of Plymouth, State of Massachusetts, have invented an Improvement in Rail-Bonds, of which the following description, in connection with the accompanying drawings, is a specification, like letters on the drawings representing like parts.

This invention has for its object to improve the construction of rail-bonds of the type comprising, essentially, a laminated strip of copper or equivalent material, to the end that the extremities of the strip may be very securely held together, so as to insure perfect electrical connection between the several parts composing the bond, and also to the end that the bond may be very securely attached to the rail.

In accordance with this invention the laminated strip is composed of a number of like superimposed plates or strips of copper or other material formed to present a pair of flat feet and an intermediate extensible portion, said plates or strips being made separate or independent of each other, and when placed one upon another the flat feet will comprehend the free ends of all the plates or strips. The free ends of all the plates or strips are dipped in melted solder, which is caused to enter between them, and they are then pressed together by a suitable clamp and secured by the hardening of the solder. It sometimes happens that when the solder alone is depended upon for securing said strips together by oversight or negligence of the workman the free ends of every strip are not entirely coated with solder and an imperfect connection results, and in practice it is very difficult to detect this faulty construction until after the bond has been put in use.

My present invention therefore comprehends the employment for an additional fastening of the strips, so that notwithstanding the bond may be of faulty construction its component parts will still be securely held together. I employ as such additional fastening a rivet which passes through several layers composing the flat feet of the bond. This rivet may be long enough to protrude sufficiently to also pass through a hole in the rail, if desired, or it may be made short. As a thick sheet of solder is attached to the bottoms of the flat feet, said sheet will be provided with a hole for the protruding end of the rivet, provided a long rivet is employed; but if a short rivet is employed this sheet will cover, and thereby conceal, the end of the rivet.

Figure 1:
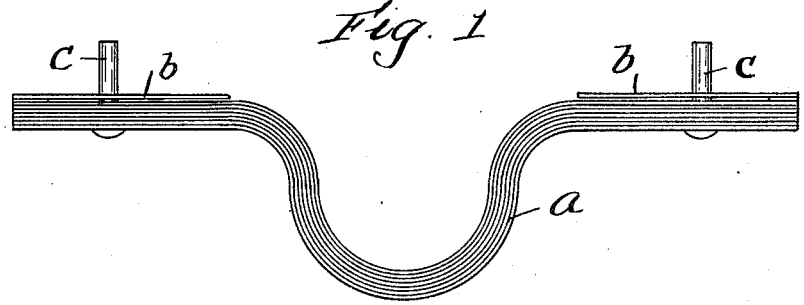
Figure 2:
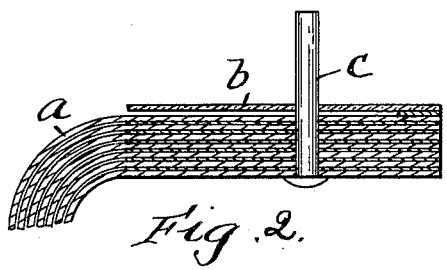
Figure 3:
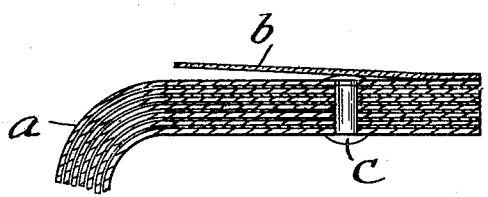

Figure 1 shows in side elevation a rail-bond, the several layers composing its flat feet being secured together by solder and also by a rivet passing therethrough and through a hole in the sheet of solder which is attached to the bottoms of the flat feet. Fig. 2 is an enlarged vertical longitudinal section of one end of the bond. Fig. 3 is an enlarged vertical longitudinal section of a rail-bond similar to that shown in Fig. 1, having a short rivet which passes only through the several layers composing the flat feet.

The laminated strip comprises a plurality of plates or strips $a$ of copper or other metal made of substantially the same length and placed one upon another. These several plates or strips are bent or formed to present a pair of flat feet and an intermediate extensible portion, which is herein shown as arched, although it may be of any other design. The free ends or extremities of the laminated strip are dipped in melted solder for the purpose of securing them together, and quite a number may be dipped at the same time, and while held in the melted solder the free ends will spring apart more or less, so that the end of each plate or strip will be coated with solder. The free ends of the plates or strips are then pressed together by a suitable clamp, so that when the solder hardens they will firmly secure said ends together. The plates or strips will not be secured together along their intermediate portion. A thick sheet of solder $b$ is applied to the bottoms of the flat feet, it being made large enough to practically cover the bottoms of the feet, and in practice I prefer to attach said sheets of solder to the flat feet at one end only. A long rivet $c$ is driven through the several layers composing the flat feet and through a hole in said sheet of solder $b$, and its protruding end will project through a hole in the rail to thereby rivet the bond to the rail in addition to securing it thereto by solder. In case it is not desired to rivet the bond to the rail a short rivet may be employed, as shown in Fig. 3, wherein it will be seen that said rivet only passes through the several layers composing the flat feet, the end of the rivet being covered, and thereby concealed, by the thick sheet of solder which is attached to the bottom of the flat foot.

What I claim, and desire to secure by Letters Patent, is—

1. A rail-bond composed of a laminated strip having flat feet and an intermediate extensible portion, solder interposed between the several layers composing said flat feet, a rivet passing through said layers and a strip of sheet-solder attached at one end to the bottoms of said flat feet, substantially as described.

2. A rail-bond composed of a laminated strip having flat feet and an intermediate extensible portion, solder interposed between the several layers composing said flat feet, a rivet passing through said several layers and a strip of sheet-solder attached at one end to the bottoms of said flat feet having a hole through it for the protruding end of said rivet, substantially as described.

In testimony whereof I have signed my name to this specification in the presence of two subscribing witnesses.

MORRIS F. WHITON.

Witnesses:
B. J. NOYES,
H. B. DAVIS.